US009767096B2

(12) United States Patent
Goldberger et al.

(10) Patent No.: US 9,767,096 B2
(45) Date of Patent: Sep. 19, 2017

(54) SYSTEMS AND METHODS FOR INTERNATIONALIZATION SUPPORT

(71) Applicant: General Electric Company, Schenectady, NY (US)

(72) Inventors: Chen Goldberger, Skaneateles, NY (US); Bryan David Maule, Camillus, NY (US); Thomas Charles Ward, Auburn, NY (US); Thomas Durkee Britton, Syracuse, NY (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 14/292,771

(22) Filed: May 30, 2014

(65) Prior Publication Data
US 2015/0347396 A1 Dec. 3, 2015

(51) Int. Cl.
*G06F 17/20* (2006.01)
*G06F 17/28* (2006.01)
*G01M 99/00* (2011.01)
*G06F 17/24* (2006.01)
*G06F 9/44* (2006.01)

(52) U.S. Cl.
CPC ........... *G06F 17/289* (2013.01); *G01M 99/00* (2013.01); *G06F 9/4448* (2013.01); *G06F 17/24* (2013.01)

(58) Field of Classification Search
USPC ....................................................... 704/3–9
See application file for complete search history.

(56) References Cited

U.S. PATENT DOCUMENTS

| 6,735,759 | B1 | 5/2004 | Yamamoto et al. |
| 2006/0156278 | A1 | 7/2006 | Reager |
| 2014/0049254 | A1* | 2/2014 | Kubota .................... G01B 7/12 324/228 |
| 2014/0123039 | A1 | 5/2014 | Ozer et al. |
| 2014/0189048 | A1* | 7/2014 | Messinger .............. H04L 67/10 709/217 |
| 2014/0189851 | A1* | 7/2014 | Domke ................... G06F 21/31 726/17 |
| 2014/0189876 | A1* | 7/2014 | Messinger .............. G06F 21/10 726/26 |
| 2014/0207601 | A1* | 7/2014 | Soorianarayanan ........................... G06F 21/6218 705/26.1 |

(Continued)

OTHER PUBLICATIONS

A PCT Search Report and Written Opinion issued in connection with corresponding PCT Application No. PCT/US2015/031708 on Sep. 29, 2015.

*Primary Examiner* — Leonard Saint Cyr
(74) *Attorney, Agent, or Firm* — Fletcher Yoder, P.C.

(57) ABSTRACT

Systems, methods, and tangible, non-transitory, computer readable media is described herein. For example, a system includes a portable non-destructive testing (NDT) device. The NDT device includes a display, a user interface, a memory storing an operations object having a first text in a first language, and a processor. The processor is configured to present the first text on the operations object via the display during an operation of the portable NDT device, and wherein the processor is configured to create a second text in a second language via the user interface of the NDT device, and to present the second text on the operations object as an alternative to the first text via the display during the operation of the NDT device.

20 Claims, 6 Drawing Sheets

(56) References Cited

U.S. PATENT DOCUMENTS

2014/0207875 A1\* 7/2014 Messinger ............ H04L 65/403
709/206
2014/0208159 A1\* 7/2014 Soorianarayanan .... G06F 11/26
714/27

\* cited by examiner

SYSTEMS AND METHODS FOR INTERNATIONALIZATION SUPPORT

BACKGROUND

The subject matter disclosed herein relates to internationalization support, and more specifically, to internationalization support of mobile devices.

Certain devices may be used to inspect a variety of systems and facilities, such as power generation equipment and facilities, oil and gas equipment and facilities, aircraft equipment and facilities, manufacturing equipment and facilities, and the like. The inspection equipment may include various non-destructive inspection or non-destructive testing (NDT) mobile devices. For example, video borescopes, portable eddy current inspection devices, portable X-ray inspection devices, and the like, may be used to observe or otherwise inspect the system and facilities using non-destructive inspection techniques. The portable devices may include text in one or more languages, useful in operating the devices. For example, during equipment use, the equipment may provide textual indications suitable for operations of the equipment. It would be beneficial to improve the language support of the aforementioned mobile devices.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a portable non-destructive testing (NDT) device. The NDT device includes a display, a user interface, a memory storing an operations object having a first text in a first language, and a processor. The processor is configured to present the first text on the operations object via the display during an operation of the portable NDT device, and wherein the processor is configured to create a second text in a second language via the user interface of the NDT device, and to present the second text on the operations object as an alternative to the first text via the display during the operation of the NDT device.

In another embodiment, tangible, non-transitory, computer readable medium storing executable instructions is provided. The instructions are configured to present a first text in a first language on an operations object via a display during an operation of a mobile device. The instructions are additionally configured to create a second text in a second language via a user interface of the mobile device. The instructions are further configured to present the second text via the operations object on the display as an alternative to the first text during the operation of the mobile device.

In yet another embodiment, a method includes presenting a first text in a first language on an operations object via a display during an operation of a portable non-destructive testing (NDT) device. The method further includes creating a second text in a second language via a user interface of the portable NDT device. The method additionally includes presenting the second text via the operations object on the display as an alternative to the first text during the operation of the portable NDT device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
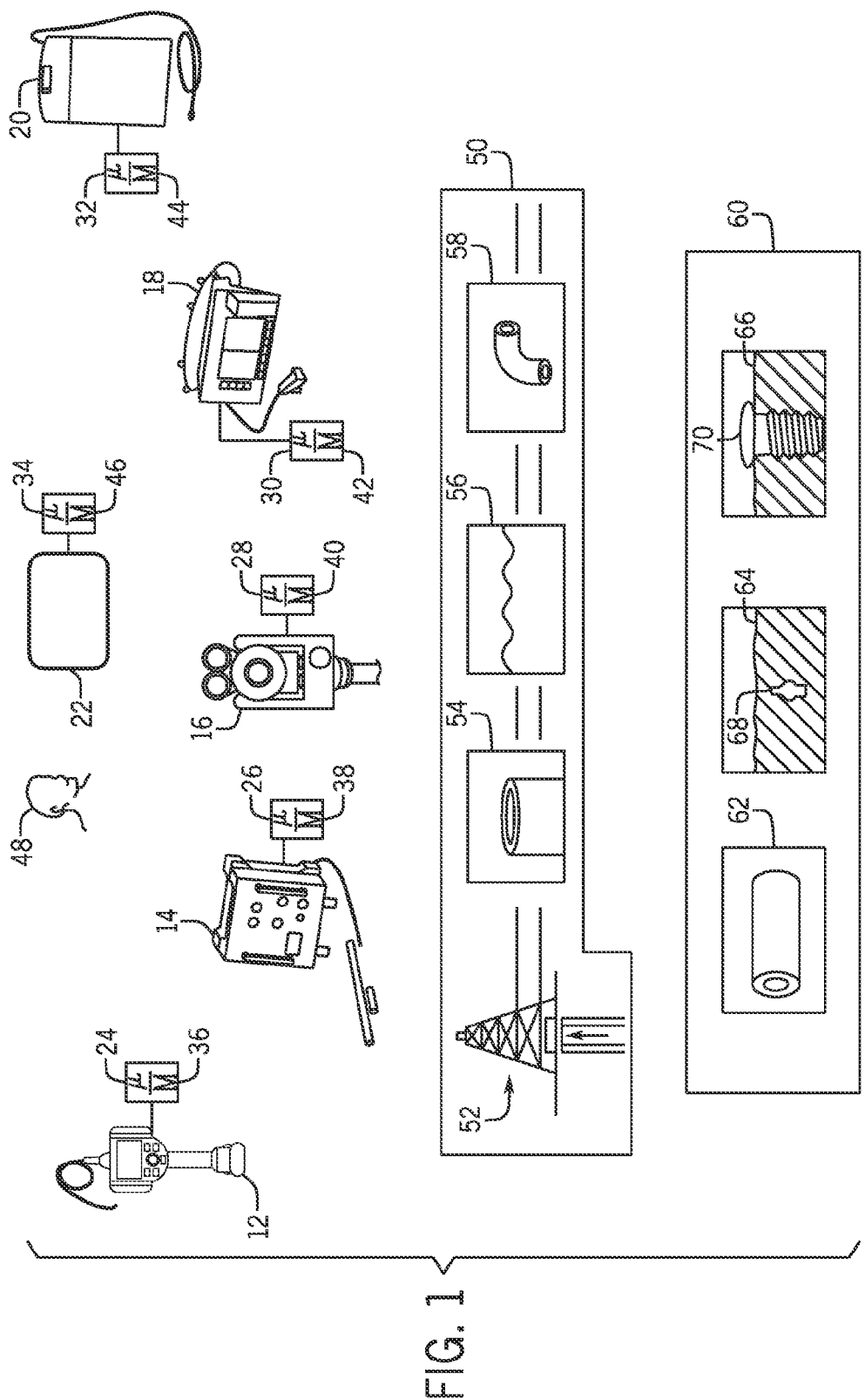
FIG. 1 illustrates embodiments of a plurality of non-destructive testing (NDT) mobile systems including language support (e.g. internationalization support), in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may apply to a variety of inspection and testing techniques, including non-destructive testing (NDT) or inspection systems. In the NDT system, certain systems such as borescopic inspection systems, weld inspection systems, remote visual inspections, x-ray inspection, ultrasonic inspection, eddy current inspection, and the like, may be used to analyze and detect a variety of conditions, including but not limited to corrosion, equipment wear and tear, cracking, leaks, and so on. The NDT systems may include portable NDT systems that may be useful in performing, for example, field testing and evaluation. The portable NDT systems may include text and/or multimedia (e.g., images, video, audio) objects useful in providing menus, instructions, button labels, and the like, suitable for operating the system.

The text and multimedia objects, generally referred to herein as "internationalization objects," may be presented during operations of the portable NDT system in a variety of languages and idioms. For example, a menu object labeled "Help" in English may be labeled as "Ayuda" in Spanish, "Aider" in French, "Hilfe" in German, and so on. Accordingly, an NDT user may select a language appropriate to his or her background, and operate the portable NDT system more efficiently. Likewise, multimedia, including images, video, and/or audio, may provide for different presentations based on the language or idiom selected. The techniques described herein provide for in situ customization of the languages (text, images, video, and audio) supported by the portable NDT systems. Indeed, a user may edit an existing language, create a new language, or create an existing language in the field, as described in more detail below, to customize the language features supported. The customizations may then be shared locally with other portable NDT systems, e.g., through Wi-Fi, personal area networks (PANs), Universal Serial Bus (USB) memory stick, Secure Digital (SD) cards, and the like. The language customizations may also be distributed more widely, for example, by uploading the language customizations to a "cloud" system, a web site, an file transfer protocol (ftp) server, and so on, suitable for then providing the language customizations to any number of locations and user of the portable NDT system. By enabling on-device customization of a variety of language support features, the techniques described herein may provide for improved operational effectiveness and user-centric support.

By way of introduction, and turning now to FIG. 1, the figure is a block diagram of embodiments of a variety of portable NDT systems that may include the techniques described herein. In the depicted embodiment, the portable NDT systems may include a video borescope 12, an eddy current inspection device 14, a transportable pan-tilt-zoom (PTZ) camera 16, an ultrasonic flaw detector 18, a portable the digital radiography device 20, and an interface device 22. The interface device 22 may be a mobile device (e.g., cell phone, laptop, tablet) communicatively coupled to the aforementioned NDT systems 12, 14, 16, 18, 20, 22 suitable for providing enhanced visualization (e.g., at a larger screen display), and for remote control and operations of the NDT systems 12, 14, 16, 18, 20, 22. The NDT systems 12, 14, 16, 18, 20, 22 may be connected to each other and/or to local servers (e.g., local area network [LAN] servers), remote servers (e.g., wide area network [WAN] servers), and "cloud" based devices and services. In one embodiment, the interface device 22 may be a MENTOR™ hardware device or software "app" executable via a mobile device (e.g., cell phone, tablet) available from General Electric Company, of Schenectady, N.Y. Likewise, the 12, 14, 16, 18, 20, 22 devices may also be available from General Electric Company, of Schenectady, N.Y. It is also to be noted that, in another embodiment, the borescope 12 may be an optical borescope (e.g., image only borescope).

The depicted NDT devices 12, 14, 16, 18, 20, 22 include respective processors 24, 26, 28, 30, 32, 34 and memory 36, 38, 40, 42, 44, 46. The NDT devices 12, 14, 16, 18, 20, 22 may additionally include a communications system suitable for communicating with other NDT devices 12, 14, 16, 18, 20, 22 and with external systems such as "cloud" based systems, servers, computing devices (e.g., tablets, workstations, laptops, notebooks), and the like. The memory 36, 38, 40, 42, 44, 46 may include tangible storage suitable for storing computer code or instructions implementing various techniques described herein and executable via the respective processors 24, 26, 28, 30, 32, 34. The devices 12, 14, 16, 18, 20, 22 may also include respective displays useful in visualizing the techniques described herein. In operations, a user 48 may utilize the NDT systems 12, 14, 16, 18, 20, 22 to inspect facilities 50, including facilities that may have equipment such as oil and gas equipment 52, and may include locations such as the interior of pipes or conduits 54, underwater (or underfluid) locations 56, and difficult to observe locations such as locations having curves or bends 58. Other systems 60 may also be inspected, such as aircraft systems, power generation systems (gas turbines, steam turbines, wind turbines, hydroturbines, combustion engines, generators, electric motors), machinery (compressors, expanders, valves, actuators), and the like, that may include conduits 62, various surfaces 64 and 66, and may be used to find undesired cracks 68 or to visualize parts 70, among many other uses. Accordingly, it may be possible to enhance the visual observation of various equipment, such as an aircraft system 60 and facilities 50, with x-ray observation modalities, ultrasonic observation modalities, and/or eddy current observation modalities. For example, the interior and the walls of pipes 54, 58, 62 may be inspected for corrosion and/or erosion. Likewise, obstructions or undesired growth inside of the pipes 54, 58, 62 may be detected by using the devices 12, 14, 16, 18, 20 and/or 22. Similarly, fissures or cracks 68 disposed inside of certain ferrous or non-ferrous material 64, 66 may be observed. Additionally, the disposition and viability of parts 70 inserted inside of a components may be verified. Indeed, by using the techniques described herein, inspection of facilities 50 and equipment 60 may be improved.

Figure 2:
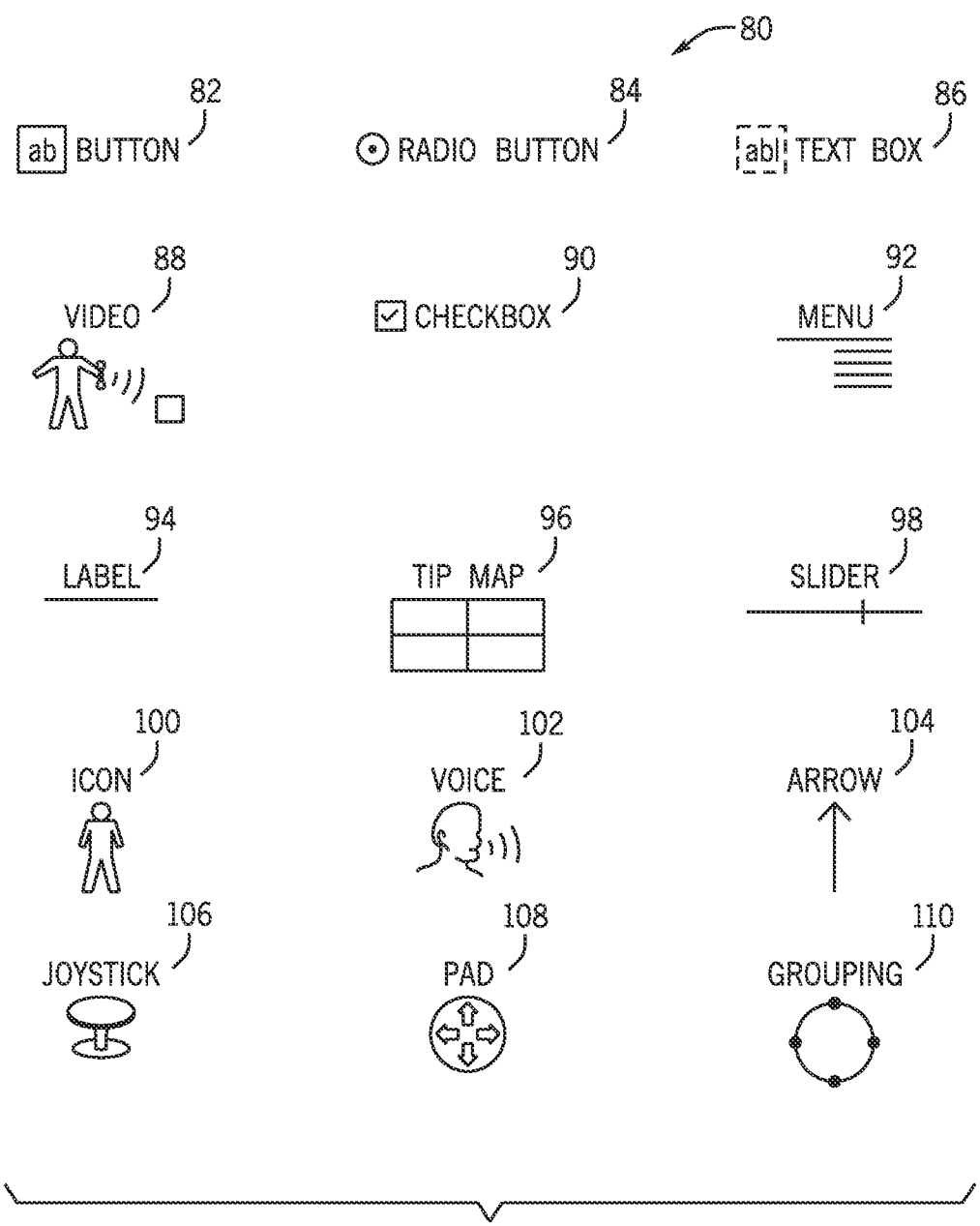
FIG. 2 is a view of embodiments of a plurality of objects that may provide for internationalization support.

In operation, the user 48 may be presented with a number of objects, included text objects, multimedia objects, and/or audio objects, suitable for viewing and/or controlling operations of the devices 12, 14, 16, 18, 20, 22, such as the objects (e.g., operations objects) 80 depicted in FIG. 2. More specifically, the objects 80 may be provided by the manufacturer of the devices 12, 14, 16, 18, 20, 22 as part of a graphical user interface (GUI) and/or applications useful in operating the devices. For example, the objects 80 may include a labeled button control 82 that may be used to activate or deactivate components (hardware or software components) of the NDT devices 12, 14, 16, 18, 20, 22. A labeled radio button 84 may be used to select or deselect components of the NDT devices 12, 14, 16, 18, 20, 22. A labeled textbox control 86 that may be used to display any number of textual data (e.g., sensor data, annotations, notes, time/date, parameter settings, and so on). A video 88 may be used to display moving images. A labeled checkbox control 90 may be used to check or uncheck features (hardware or software features) of the NDT 12, 14, 16, 18, 20, 22. A labeled menu control 92 may be used to display hierarchical data. A label display 94 may be used to display a static text and a graphic, as desired. A labeled tip map control 96 may be used to display a current tip position, for example, for the borescope's 12 tip.

Likewise, a labeled slider control 98 may be used to adjust any number of hardware or software components, parameters, and so on by "sliding" to a desired level. An icon 100 may be used to display static images. An audio 102 may be used to provide audio commands, voice annotations, audio instructions, and so on. A labeled arrow control 104 may be used to point to image or video features displayed by the NDT devices 12, 14, 16, 18, 20, 22. A labeled joystick 106 and control pad 108 may be used to manipulate certain components (e.g., tip of the borescope 12) to dispose the components into a desired position.

Similarly, a labeled grouping control 110 may be used to "lasso" or group components in order to move the components, delete the components from a screen, and so on. Indeed, any number of visualizations, video, and/or audio may be presented by the NDT devices 12, 14, 16, 18, 20, 22 in a variety of languages or customized for specific geographic locales. Advantageously, the techniques described herein enable the objects 80, which may be displayed in a variety of screens of the GUI (or applications) executed by the NDT devices 12, 14, 16, 18, 20, 22 to be customized by creating a new language, creating a new language based on an existing language, and editing an existing language, as described in more detail below with respect to FIG. 3. It is noted that the applications utilizing the objects 80 may additionally include third-party applications downloaded into the devices 12, 14, 16, 18, 20, 22 via, for example, a "cloud" store.

Figure 3:
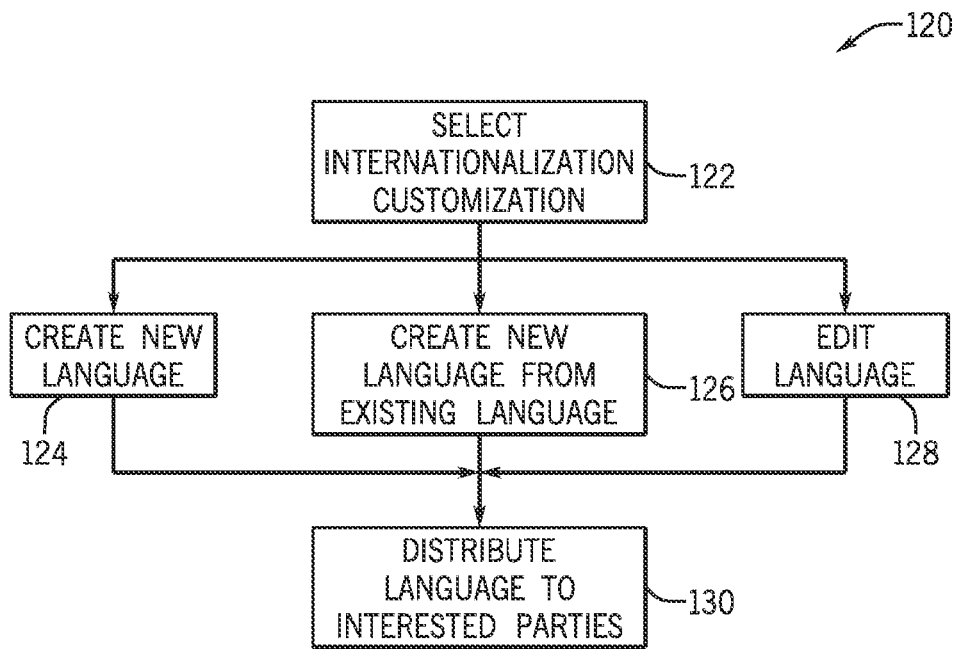
FIG. 3 is a flow chart of an embodiment of a process useful in providing for internationalization support to the NDT systems of FIG. 1.

FIG. 3 is a flowchart view of an embodiment of a process 120 that may be used, for example, by the NDT devices 12, 14, 16, 18, 20, 22 to provide for internationalization customization support. The process 120 may be implemented as computer code or instructions executable via the processors 24, 26, 28, 30, 32, 34 and stored in memories 36, 38, 40, 42, 44, 46. In the depicted embodiment, the process 120 may first enable the user 48 to select (block 122) an internationalization customization. For example, the process 120 may present, in a configuration GUI screen of the NDT devices 12, 14, 16, 18, 20, 22 an option to customize the international support provided by the NDT devices 12, 14, 16, 18, 20, 22.

Once the user 48 may selects (block 122) customization of the international support, the process 120 may then enable the user to create (block 124) a new language, create (block 126) a new language based on an existing language, and/or edit (block 128) an existing language. To create (block 124) the new language (e.g., to create text as new), the process 120 may provide a list of the objects 80 having blank text or blank multimedia so as to enable the user 48 to add the missing text and multimedia in situ in the new language, as described in more detail with respect to FIG. 4. Likewise, to create (block 126) the new language based on an existing language, the process 120 may first create a language copy based on an existing language, and then provide the language copy to the user 48 to edit on a display of the NDT device 12, 14, 16, 18, 20, 22 as described in more detail with respect to FIG. 5. Similarly, to edit (block 128) an existing language, the process 120 may provide for a list of the objects 80 to enable the user to modify the objects 80, as desired, to customize an existing language, as described in more detail below with respect to FIG. 6.

The process 120 may then distribute (block 130) the new language and/or edited languages, to interested entities. In one embodiment, one of the NDT devices 12, 14, 16, 18, 20, 22 may communicatively couple with another of the NDT devices 12, 14, 16, 18, 20, 22 and transmit the new language or language customizations, for example, via wireless techniques such as Wi-Fi (e.g., IEEE 802.11x), Bluetooth, Zigbee, Z-wave, a personal area network, a mesh network, a wired Ethernet network, and the like. Additionally or alternatively, the NDT devices 12, 14, 16, 18, 20, 22 may include a USB port and/or a SD card port suitable for the insertion of a Flash drive or SD card, which may be used to first store the new language or language customizations, and then to distribute to other NDT devices 12 also via the USB port and/or SD card port. Similarly, a USB cable, serial cable, Ethernet cable, and the like may be used to connect two NDT devices 12, 14, 16, 18, 20, 22 together to transfer the new language and/or language customizations. The NDT devices 12, 14, 16, 18, 20, 22 may also transmit the new language and/or language customizations to LAN servers, WAN servers, and "cloud" devices and services, for further storage and distribution.

It is to be noted that certain distribution (block 130) techniques including wireless and/or wired techniques may use minimal or no outside infrastructure (e.g., servers, routers, switches and the like) other than the infrastructure included in the NDT devices 12, 14, 16, 18, 20, 22 themselves. In other embodiments, the new language and/or language customizations may be uploaded to a "cloud" storage, external server, and the like, and used for further distribution to other NDT devices 12, 14, 16, 18, 20, 22 disposed in various locations. By providing for a variety of distribution techniques (block 130), including techniques that use minimal or no outside infrastructure, the disclosed embodiments may enable a more efficient work environment providing for custom or new languages created in the field and distributed to a wide variety of interested parties.

Figure 4:
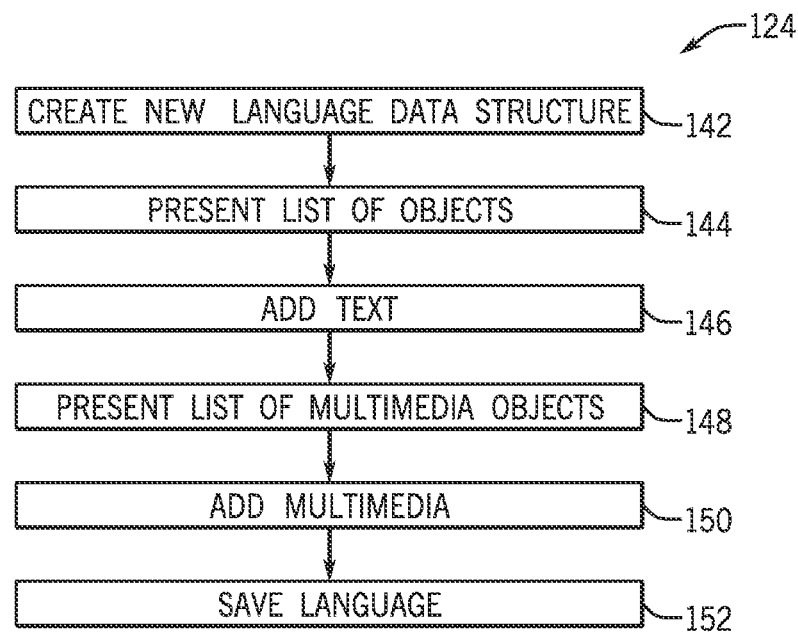
FIG. 4 is a flow chart of an embodiment of a process useful for creating a language in situ, by using the NDT devices of FIG. 1.

FIG. 4 is a flowchart showing further details of an embodiment of the process 124 (shown in FIG. 3) that may be used, for example, by the NDT devices 12, 14, 16, 18, 20, 22 to create a new language suitable for use-in a new location. The process 124 may be implemented as computer code or instructions executable via the processors 24, 26, 28, 30, 32, 34 and stored in memories 36, 38, 40, 42, 44, 46. In the depicted embodiment, the process 124 may begin by creating (block 142) a new language data structure. The new language data structure may include an XML file, a relational database, a binary file, or combinations thereof, suitable for storing language text labels and/or multimedia associated with the objects 80 (shown with FIG. 2). Accordingly, the process 124 may then present (block 144) a list of objects 80. In one embodiment, the presentation (block 144) may be provided by screens or views displayable via the GUI of the NDT devices 12, 14, 16, 18, 20, 22. That is, in one embodiment, a set of screens may be displayed one screen at a time, each screen corresponding to an operation of the NDT devices 12, 14, 16, 18, 20, 22. Each screen may include one or more objects 80, with each object 80 displayed as blank (e.g., missing labels or associated missing multimedia). In another embodiment, an alphabetical list objects 80 or a list of objects 80 ordered by any suitable ordering key, such as by object type, by the order in which objects 80 are presented to the user during operations of the NDT devices 12, 14, 16, 18, 20, 22 and so on may be provided.

The user 48 may then use the GUI to add (block 146) text to the objects 80 in the new language. The process 124 may thus enable the user 48 to type in or otherwise add text or textural description associated with objects 80 in the new language. Likewise, the process 124 may present (block 148) a list of multimedia objects 80, such as videos 88, graphics or icons 100, and/or audio 102. In one embodiment, the NDT devices 12, 14, 16, 18, 20, 22 may include multimedia capture devices such as a camera, video camera, microphone, and the like, and these multimedia capture devices may be used to capture video 88, images 100, and/or audio 102, to create or add (block 150) multimedia associated with the new language created. In another embodiment, an external camera or media capturing device may be used, and the media transferred to the NDT devices 12, 14, 16, 18, 20, 22.

The multimedia objects may then be presented by the process 124 by listing the multimedia (block 148) according to the screen presentations as mentioned above, or by any other ordering desired, such as the order in which the multimedia is presented to the user during operations of the NDT devices 12, 14, 16, 18, 20, 22. Once all desired multimedia is added (block 150), the process 124 may then save (block 152) the new language in the data structure that was created at block 142. By providing for in situ creation of the new language, the process 124 may enable a more customized presentation of a variety of operation of objects 80 in a variety of geographical locales.

Figure 5:
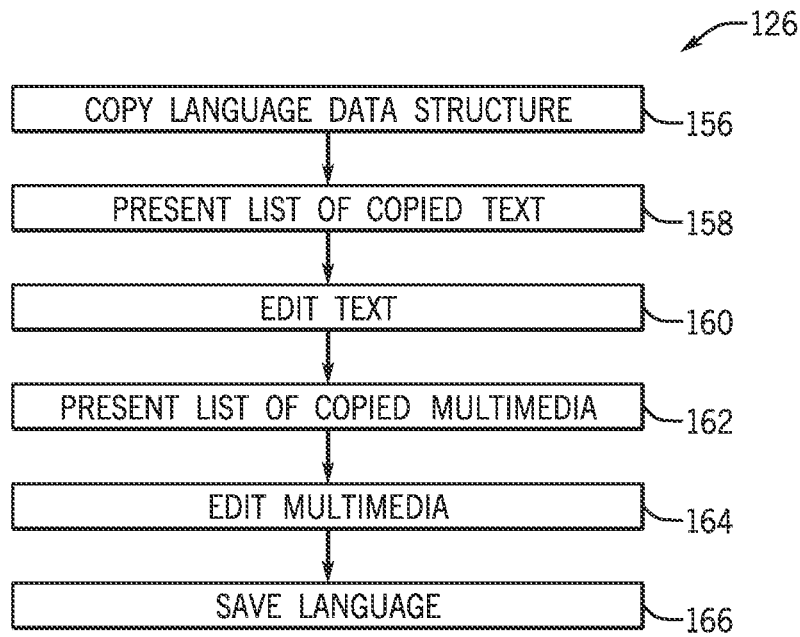
FIG. 5 is a flow chart of an embodiment of a process useful for copying a language in situ, by using the NDT devices of FIG. 1.

Turning now to FIG. 5, the figure is a flowchart showing further details of an embodiment of the process 126 (shown in FIG. 3) suitable for creating a new language based on an existing language. As mentioned above, the process 126 may be implemented as computer code or instruction executable via the processors 24, 26, 28, 30, 32, 34 and stored in memories 36, 38, 40, 42, 44, 46. In the depicted embodiment, the process 126 may first create a new copy of an existing language data structure (block 156). As mentioned earlier, the new copy data structure may include XML files, XAML files, relational database tables, binary files, and other data structures suitable for storing text and/or other multimedia. The process 126 may then present (block 158) a list of the copied text found in the original language used to create the copy. The list of text and associated objects 80 may be presented for example by enabling the user to navigate through a list of screens, such as the screens that comprise the GUI of the NDT devices 12, 14, 16, 18, 20, and/or 22. The list of text may be presented alphabetically, or in any other ordering. The process 126 may then enable the user 48 to edit (block 160) the presented text.

The text may be edited, for example, by providing a virtual keyboard on the NDT devices 12, 14, 16, 18, 20, 22 or a physical keyboard so that the user may make any modification or changes to the language. For example the user may add a new word to a phrase in the desired language to translate the copied language. The process 126 may then present (block 162) a list of multimedia that was copied from the previous language. The multimedia may include, for example, video 88, images or icons 100, and/or audio 102. The list of copied multimedia may be presented (block 162) for example by navigating through a list of screens that comprise the GUI of the NDT devices 12, 14, 16, 18, 20, 22 sequential as a list of multimedia objects, or by any other ordering mechanism.

The process 126 may then enable the editing (block 164) of the presented multimedia. For example, a multimedia editor such a video editor, an image or graphical editor, and/or an audio editor may be provided, executable via the processors 24, 26, 28, 30, 32, 34 and suitable for making modification of the presented multimedia. The multimedia editor(s) may additionally provide for downloads of additional multiple media to further customize the language that has been copied. The process 126 may then save (block 166) the copied language as a new language. The language may be saved as a XML file, a relational database set of tables, binary files, or any other storage data structure, suitable for storing textual and/or multimedia objects. By providing for capabilities to copy an existing language and to edit the copy, the techniques described herewith may enable a quicker customization of existing languages, for example allowing the creation of a variety of idioms based on an existing language at field locations. For example, a Standard English language may be copied and subsequently edited to derive an American English, a British English, and so on.

Figure 6:
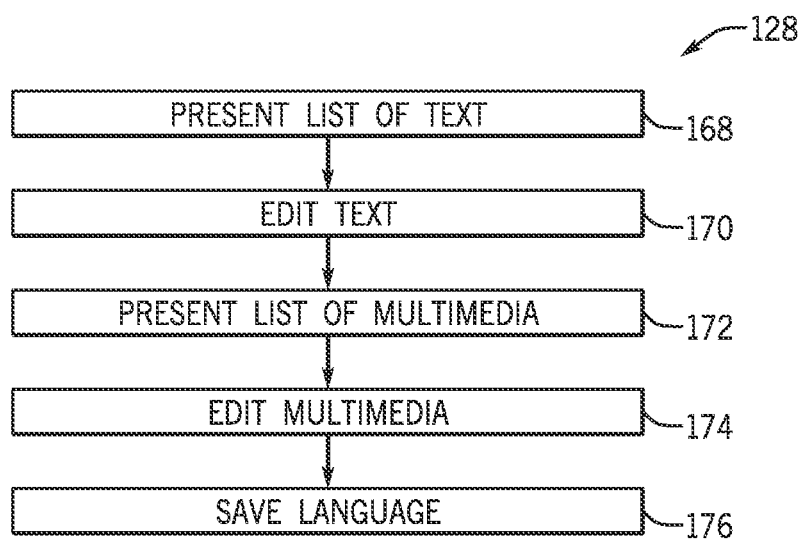
FIG. 6 is a is a flow chart of an embodiment of a process useful for editing a language in situ, by using the NDT devices of FIG. 1.

FIG. 6 is a flowchart showing further details of an embodiment of the process 128 (shown in FIG. 3) that may be used to provide for editing of the language objects 80. The process 128 may be implemented as computer code or instruction executable via the processors 24, 26, 28, 30, 32, 34 and stored in memories 36, 38, 40, 42, 44, 46. In the depicted embodiment, the process 128 may present (block 168) a list of text of the language that has been selected to edit. The list of text may be present by navigating through a series of screens that comprise the GUI of the NDT devices 12, 14, 16, 18, 20, 22 or by presenting in a single screen the text that makes up the language to be edited, ordered, for example, alphabetically or by any other ordering system.

The process 128 may then enable the user 48 to edit (block 170) the text, for example, by providing a virtual or physical keyboard suitable for manipulating the text on the NDT devices 12, 14, 16, 18, 20, 22. The text may be edited (block 170), for example by modifying words, adding words, deleting words and so on.

Once the text has been edited (block 170) as desired, the process 128 may then present (block 172) a list of multimedia to edit. The list of multimedia may be presented, for example, by listing the multimedia in a series of screens that comprise the GUI of the NDT devices 12, 14, 16, 18, 20, 22. The list of multimedia may be presented in a single screen or in a plurality of screens, and ordered, for example by alphabetical label order, by order of presentation in the GUI of the multimedia, or by any other desired ordering. The process 128 may then enable the user 48 to edit (block 174) the presented multimedia. For example, as mentioned earlier, one or more multimedia editors, such as video editors, image editors, audio editors, and the like, may be provided, executable by the processors 24, 26, 28, 30, 32, 34. Accordingly, the user 48 may edit the multimedia on the NDT devices 12, 14, 16, 18, 20, 22 to more easily customize the multimedia associated with the language undergoing editing. Advantageously, the multimedia may be edited, for example, to better adhere to culture norms of the locale of use of the NDT devices 12, 14, 16, 18, 20, 22. The process 128 may then save the changes (block 176) and thus provide the user 48 with enhanced customizations of a preexisting language to more efficiently operate in a different geographical locale.

It is to be noted that the techniques described herein may provide for voice input and voice output (e.g., text-to-speech output). For example, the processes 120, 124, 126, and/or 128 may receive voice commands and voice data as input and, for example, translate the data into text. Accordingly, a user may speak into the NDT devices 12, 14, 16, 18, 20, 22 rather than or as an alternative to typing input data. Similarly, NDT devices 12, 14, 16, 18, 20, 22 may provide voice as output, useful in situations where the user may be more engaged visually in inspecting activities.

Figure 7:
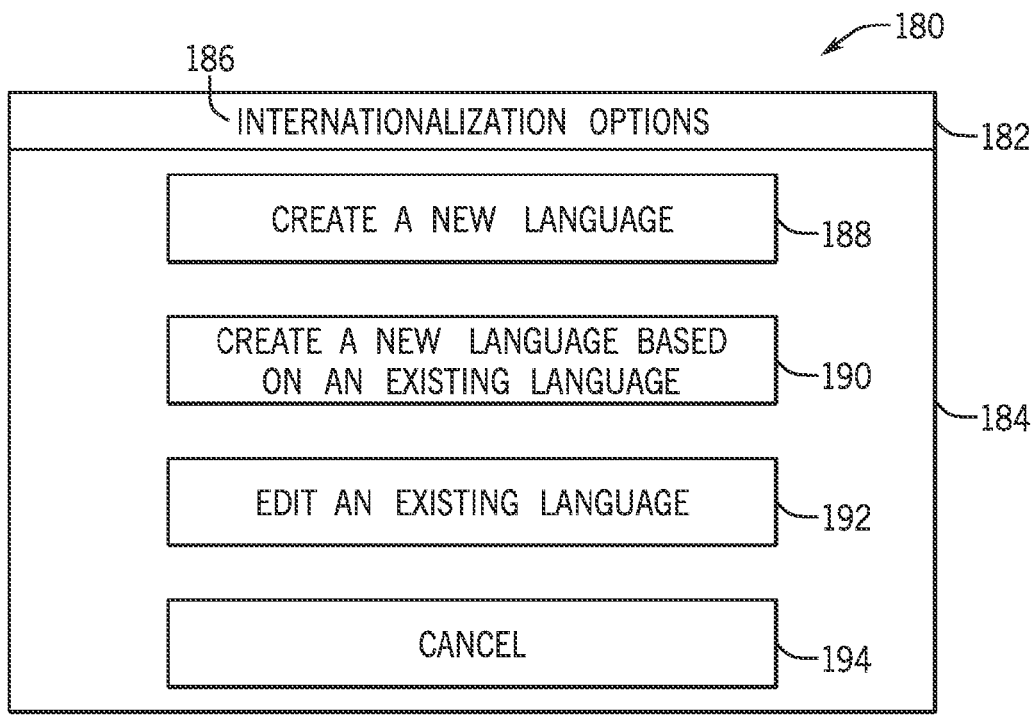
FIG. 7 is a view of an embodiment of a graphical user interface (GUI) screen that may provide for execution of the processes of FIGS. 4-6.

FIG. 7 is a view of a liquid crystal display (LCD) panel 180 that may be included in the NDT devices 12, 14, 16, 18, 20, 22 showing further details of a GUI 182 that may be used by the user 48 to provide the techniques described herein. While the figure depicts the LCD panel 180, it is to be understood that other panels and/or displays may be used, such as organic light-emitting displays (OLED), eyeglass mounted displays, cathode ray tube (CRT) displays, and so on. The GUI 182 includes a screen 184 having a status bar 186 and buttons 188, 190, 192, 194. The GUI 182 may be executed by the processors 24, 26, 28, 30, 32, 34 and stored in the memories 36, 38, 40, 42, 40, 46. In operations, the GUI 182 may present in status bar 186 a label, such as a label displaying "internationalization options" to inform the user of configurations available related to the internationalization of NDT devices 12, 14, 16, 18, 20, 22. Accordingly, the button 188 may be activated to create a new language, for example by executing the process 124 as described above with respect to FIGS. 3, 4. Likewise the button 190 may be activated to execute the process 126, suitable for creating a new language based on an existing language as described above in more detail with respect to FIGS. 3, 5.

Similarly, the button 192 may be activated to execute the process 128, suitable for editing an existing language, as described above in more detail above with respect to FIGS. 3 and 6. The button 194 may be activated to exit or otherwise cancel operations of the screen 184. The buttons 188, 190, 192, 194, may be, for example virtual buttons disposed on a touch screen that may be activated based on a user's finger touch. Other activation techniques may be used, additional or alternative to the buttons 188, 190, 192, 194, such as menus, voice control, mouse activations, and so on. Additionally, other buttons may include 'Save' buttons in any of the screens described herein, useful in saving a draft of current work.

Figure 8:
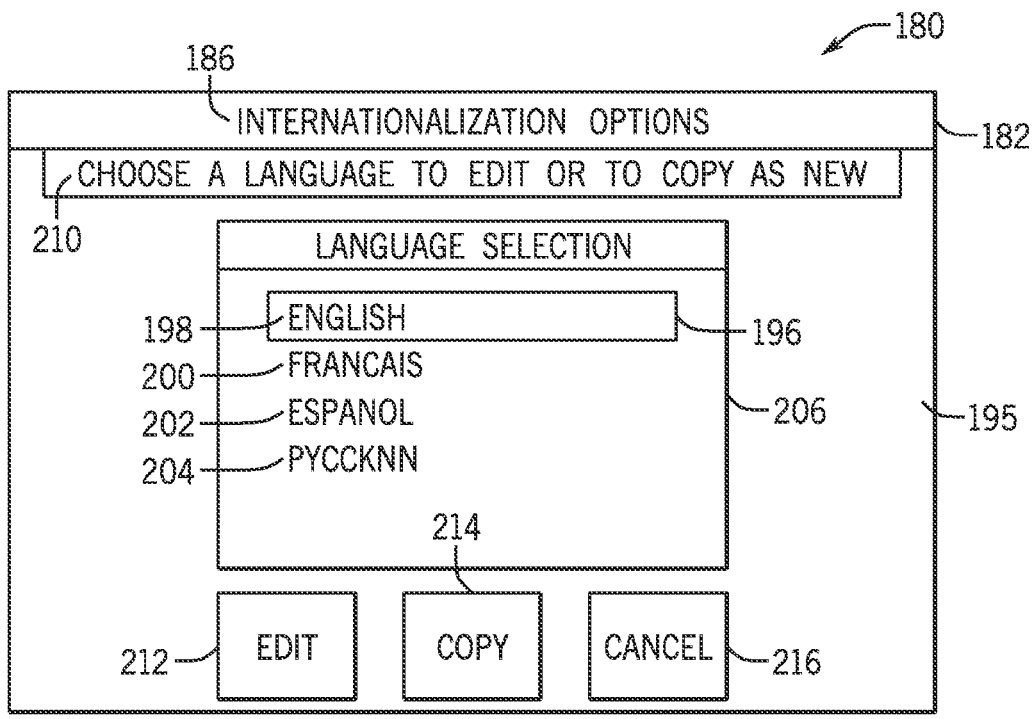
FIG. 8 is a view of an embodiment of a GUI screen that may provide for selection of one or more languages.

Turning now to FIG. 8, the figure depicts an embodiment of the LCD panel 180 where the GUI 182 is displaying a screen 195. In the depicted embodiment, the screen 195 displays a selection box 196 and a list of languages 198, 200, 202, and 204 in a screen portion 206. The user 48 may select, for example, by touching a touch screen, by manipulating a physical (or virtual) joystick, or by any other techniques, any one of the languages 198, 200, 202, 204. Once a language is selected, the screen 195 may display the selected language in selection box 196. Also depicted is an instructional text 210 that provides the user 48 with instructions related to the use of the screen 195.

In the depicted embodiment, a button 212 is provided, suitable for executing the editing process 128 that enables the selected language to be edited. Likewise, a button 214 is provided, suitable for executing the copying process 126 for the selected language. A cancel button 216 is additionally provided, suitable for canceling operations of the screen 195. As mentioned above, the buttons 212, 214, 216 may be virtual buttons but other activation techniques may additionally or alternatively be used. By providing the screen 195, a variety of languages may be more easily and efficiently customized in the field via the NDT devices 12, 14, 16, 18, 20, 22.

Figure 9:
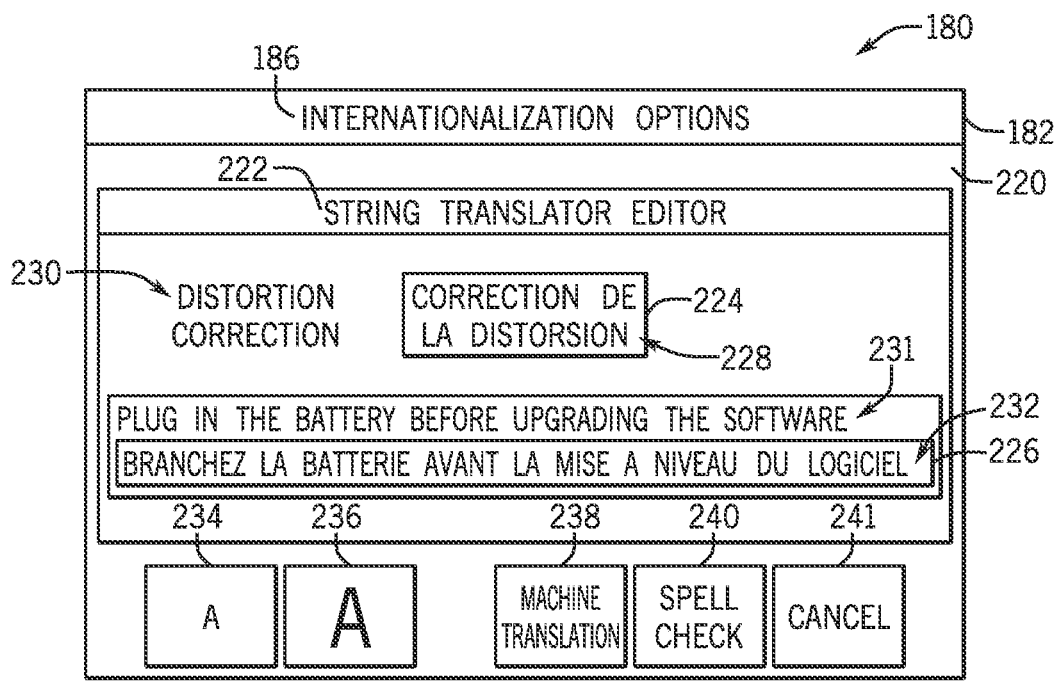
FIG. 9 is a view of an embodiment of a GUI screen that may provide for editing and/or to additions of language text.

FIG. 9 depicts an embodiment of the LCD panel 180 where the GUI 182 is displaying a screen 220 that may be used to edit and/or to add language text. In the depicted embodiment, a string editor 222 is provided. In one embodiment, the string editor 222 may include techniques such as auto completion, where the user 48 may only type a portion of text and the editor may present various options to finish typing the remaining text. Auto translate may also be used, where the user 48 types text and the editor 222 may automatically translates the text to a desired language, for example, via local databases (e.g., databases included in a local language translation system executable by processors 24, 26, 28, 30, 32, 34 and stored in the memory 36, 38, 40, 42, 44, 46) or remote services (e.g., "cloud" translation services).

Text controls 224 and 226 may be sized to fit in certain portions of various screens of the GUI 182. Accordingly, the techniques described herein enable a user to edit text respecting size constraints so as to not overhang or over fit desired areas. For example a text 228 in French is presented inside of the button 224, based on an English text 230. As the user types the text 228, the screen 220 inserts the text into the button 224. Additional text may result in the text not fitting within the area of the button 224. In such event, screen 220 may stop entering text or may warn the user 48. For example, a pop-up dialog box or a visual (or audio) indication that the text 228 no longer fits may be provided.

Likewise, the depicted embodiment shows an English text 231 and an equivalent French text 232. The text 232 being disposed inside of the control 226 (e.g., a text label box 226). As the user 48 translates the text 231 into the text 232 and types the text 232 inside the control 226, the user can visually track the amount of text that may comfortably fit inside of the control 226. Accordingly, the GUI 182 may provide visual indications suitable for determining whether certain translations would fit inside a certain portions of the GUI 182. Additionally or alternatively, the GUI 182 may stop enabling the entering of additionally text 232 once the text 228 or 232 reaches a certain size.

Also depicted are fonts controls, such as the font sizing controls 234 and 236. In use, the user 48 may select, for example, the text 228 and/or the text 232, and then activate the button 234 to reduce font size, for example, to enable longer strings to fit within the controls 224 and/or 226. Likewise, the user may select the text 228 and/or 232 and then subsequently activate button 236 to enlarge the text. Other controls not shown may be provided, such as controls that provide for changing properties of the text 228, 226, such as font type, font color, the use of bolding, the use of italics, the use of various font types (e.g., Verdana, Times New Roman, as well as Unicode fonts such as Arabic, Chinese, Japanese, and so on). Indeed, a wide variety of properties for the text 228, 232 may be changed via the GUI 182 to provide for enhanced user customization of the edited or created language.

The GUI 182 may additionally include certain techniques useful in translating and manipulating text. For example, a button 238 is depicted, suitable for enabling machine translation. In use, the text 230 and/or 231 may be selected and the button 238 may then be activated. The user may additionally or alternatively type text in a first language in the controls 224, 232, and then activate the button 238 to convert the typed text into a second language. By activating the button 238, a translation of the text may be provided, for example through an internal database or through an external translation service, such as "cloud" services (e.g., Google Translate, Babelfish, Bing Translator). The activation of the button 238 may additionally interface with a human translator to provided translation services. Additionally, a button 240 is provided, suitable for performing spell checking and/or grammar checking of the text 230, 232. For example the spell check may provided by accessing an internal spell check of the NDT devices 12, 14, 16, 18, 20, and 22 that includes support for a variety of languages. Additionally or alternatively, the spell check 240 may be provided by accessing an external service or database that may perform, for example, an automatic spell check and/or grammar check of text provided. In this manner, the user more efficiently translates the text 230, 231, into the text 228, 232 thus minimizing an amount of translation effort.

Figure 10:
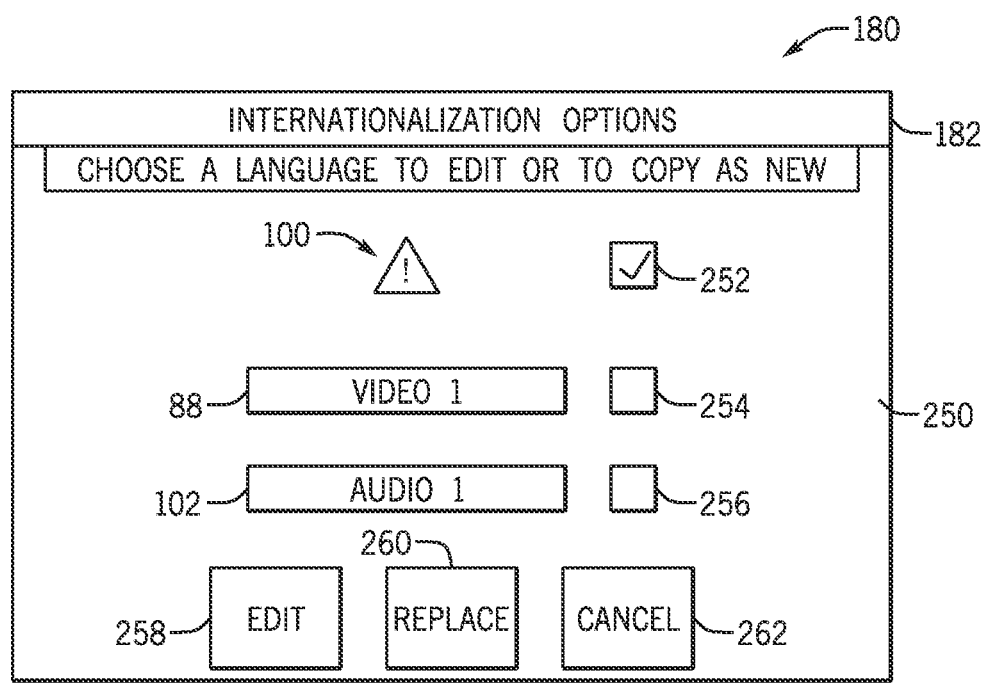
FIG. 10 is a view of an embodiment of a GUI screen that may provide for editing and/or to additions of media objects for different languages.

FIG. 10 depicts an embodiment of the LCD panel 180 where the GUI 182 is displaying a screen 250. The screen 250 may be used to edit or replace (e.g., replacing by creating as new), multimedia of various types. The multimedia, as described above, may include video 88, images or icons 100, and/or audio 102. During operations the user 48 may select one more of the media 88, 100, 102 for example, by checking the appropriate check box 252, 254, 256. In use, an edit button 258 may be activated, which may then launch a media editor suitable for editing the appropriate media based on media type. The media editor may include a video editor, an audio editor, an image editor, or a combination thereof. The media editor may be executed by respective processors in the NDT device 12, 14, 16, 18, 20, and 22 and may thus be launched by the GUI 182 to edit the appropriate media type. In another embodiment, the edit button 258 may activate an external editor, such as an editor provided via a cloud system suitable for editing the appropriate media type.

Should the user 48 desire to replace the depicted media 88, 100, 102 the user 48 may activate a replace button 260, which may then provide for a facility to either upload a new replacement media, for example by connecting to an external or internal media library, or, may provide for a facility to replace the media by creating a new media. For example, the NDT devices 12, 14, 16, 18, 20, and 22 may include a camera, a microphone, and/or a touch screen media creation software, such as an image creation program, which may enable the user 48 to capture and create replace various media. A cancel button 262 is also provided, which may be used to exit the screen 250 once the user 48 is done performing any tasks associated with the screen 250. By providing for a variety of techniques to edit, replace, and/or create a variety of media types, the disclosure described herein enables a more efficient customization of languages that may provide for a more efficient and user focused language customization in a variety of geographic locales.

It is also to be noted that, in one embodiment, a first user may view one or more operations objects 80 in a first language in a first screen, and also view one or more operations objects 80 in a second language in a second screen. In another embodiment, the first user may view one or more operations objects 80 in the first language in a first screen, and a second user may view one or more operations objects 80 the second screen. Indeed, the NDT devices 12, 14, 16, 18, 22 may display more than one language each language in a different screen, or multiple languages in the same screen, with portions of the screen displaying different languages.

Technical effects of the invention include providing for an NDT system useful in increasing customization support of a variety of languages in situ. Once customized, the languages may be provided to a variety of interested entities, both local and remote, thus increasing collaboration between parties, including but not limited to asset owners, inspection solution providers, regulatory entities, asset OEMs, asset inspection providers, and application developers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a portable non-destructive testing (NDT) device comprising:
a display;
a user interface;
a memory storing an operations object having a first text in a first language; and
a processor configured to non-destructively test an item, wherein the processor is configured to present the first text on the operations object via the display during a sensing operation of the portable NDT device, and wherein the processor is configured to create a second text in a second language via the user interface of the NDT device, and to present the second text on the operations object as an alternative to the first text via the display during the sensing operation of the NDT device, wherein the processor is configured to present a first multimedia in the first language during the sensing operation of the portable NDT device, and wherein the processor is configured to create a second multimedia in the second language as an alternative to the first multimedia during an operation of the NDT device, wherein the portable NDT device comprises a communications system configured to transmit data wirelessly, to transmit data through one or more wired conduits, or a combination thereof, and wherein the processor is configured to transmit the second text to a second portable NDT device.

2. The system of claim 1, wherein the portable NDT device comprises a borescope, a portable eddy current inspection device, a transportable radiography device, a portable ultrasonic flaw detector, a transportable pan-tilt-zoom (PTZ) camera, an NDT tablet interface device, or a combination thereof.

3. The system of claim 1, wherein the operations object comprises a menu, a combobox, a list box, a radio button, a screen portion, a button control, a textbox control, a menu control, a tip map control, a slider control, an arrow control, a virtual joystick, a virtual control pad, or a grouping control, or a combination thereof.

4. The system of claim 1, wherein the multimedia comprises a video, an image, an icon, an audio, or a combination thereof, useful in aiding the operation of the NDT device.

5. The system of claim 1, wherein the processor is configured to create the second text in the second language by copying the first text in the first language.

6. The system of claim 1, wherein the processor is configured to create the second text in the second language by editing the first text.

7. The system of claim 1, wherein the processor is configured to create the second text in the second language as a new text.

8. The system of claim 1, wherein the processor is configured to transmit the second text to an external system via the communications system.

9. The system of claim 1, wherein the processor is configured to display the second text in a control and to visually show if the second text fits in the control.

10. The system of claim 1, wherein the processor is configured to translate the first text into the second text via an internal language translation system, via an external language translation service, or a combination thereof.

11. The system of claim 1, wherein the processor is configured to create the second multimedia in the second language as an alternative to the first multimedia during the sensing operation of the NDT device.

12. A tangible, non-transitory, computer readable medium storing executable instructions configured to:
- non-destructively test an item;
- present a first text in a first language on an operations object via a display during a sensing operation of a portable non-destructive testing (NDT) device;
- create a second text in a second language via a user interface of the mobile device;
- present the second text via the operations object on the display as an alternative to the first text during the sensing operation of the portable non-destructive testing (NDT) device;
- present a first multimedia in the first language during the operation of the portable NDT device;
- create a second multimedia in the second language as an alternative to the first multimedia during an operation of the NDT device; and
- transmit the second multimedia from the portable NDT device to a second portable NDT device via a communications system.

13. The computer readable medium of claim 12, wherein the mobile device comprises a portable non-destructive testing (NDT) device, and wherein the instructions are configured to be executed by a processor included in the portable NDT device.

14. The computer readable medium of claim 12, wherein the operations object comprises a menu, a combobox, a list box, a radio button, a screen portion, a button control, a textbox control, a menu control, a tip map control, a slider control, an arrow control, a virtual joystick, a virtual control pad, a grouping control, or a combination thereof.

15. The computer readable medium of claim 12, wherein the instructions comprise instructions configured to translate the first text into the second text via an internal language translation system, via an external language translation service, or a combination thereof.

16. The computer readable medium of claim 12, wherein the instructions comprise instructions configured to present the second text in a control and to visually show if the second text fits in the control.

17. The computer readable medium of claim 12, wherein the instructions configured to create the second multimedia in the second language comprise instructions configured to create a second multimedia in the second language as an alternative to the first multimedia during the sensing operation of the NDT device.

18. A method, comprising:
- non-destructively testing an item;
- presenting a first text in a first language on a sensing operations object via a display during an operation of a portable non-destructive testing (NDT) device;
- creating a second text in a second language via a user interface of the portable NDT device;
- presenting the second text via the sensing operations object on the display as an alternative to the first text during the operation of the portable NDT device;
- presenting a first multimedia in the first language during the operation of the portable NDT device;
- creating a second multimedia in the second language as an alternative to the first multimedia during the sensing operation of the NDT device; and
- transmitting the second multimedia from the portable NDT device to a second portable NDT device via a communications system.

19. The method of claim 18, wherein creating the second text in the second language comprises making a copy of the first text.

20. The method of claim 18, wherein creating the second text in the second language comprises editing first text, and wherein the second language comprises a dialect of the first language.

* * * * *